US012791719B2

(12) United States Patent
Ishii

(10) Patent No.: US 12,791,719 B2
(45) Date of Patent: Nov. 10, 2026

(54) CANCEL A VOLTAGE DEPENDENT PHASE ERROR OF A TIME OF FLIGHT IMAGING DEVICE

(71) Applicant: Sony Semiconductor Solutions Corporation, Atsugi (JP)

(72) Inventor: Hiroyasu Ishii, Stuttgart (DE)

(73) Assignee: Sony Semiconductor Solutions Corporation, Atsugi (JP)

( * ) Notice: Subject to any disclaimer, the term of this patent is extended or adjusted under 35 U.S.C. 154(b) by 992 days.

(21) Appl. No.: 17/792,412

(22) PCT Filed: Jan. 19, 2021

(86) PCT No.: PCT/EP2021/051036
§ 371 (c)(1),
(2) Date: Jul. 13, 2022

(87) PCT Pub. No.: WO2021/148390
PCT Pub. Date: Jul. 29, 2021

(65) Prior Publication Data

US 2023/0056262 A1 Feb. 23, 2023

(30) Foreign Application Priority Data

Jan. 21, 2020 (EP) .................................... 20152824

(51) Int. Cl.

| | |
|---|---|
| ***G01S 17/894*** | (2020.01) |
| ***G01S 7/497*** | (2006.01) |
| ***G01S 17/36*** | (2006.01) |

(52) U.S. Cl.
CPC ............ *G01S 17/894* (2020.01); *G01S 7/497* (2013.01); *G01S 17/36* (2013.01)

(58) Field of Classification Search
None
See application file for complete search history.

(56) References Cited

U.S. PATENT DOCUMENTS

2015/0145764 A1 5/2015 Hiromi
2016/0116592 A1 * 4/2016 Hiromi ................ G01S 7/4918 250/341.1
2016/0161610 A1 6/2016 Hiromi

FOREIGN PATENT DOCUMENTS

CN 105699955 A 6/2016
WO 2008/005516 A2 1/2008

OTHER PUBLICATIONS

Ge Young, et al. "Study on the relationship of phase Uncertainties, Position Uncertainties and Gray Uncertainties and the Pixel Uncertainty of SAR Origianl image", Aug. 10, 2003, pp. 285-291.
International Search Report and Written Opinion mailed on Mar. 24, 2021, received for PCT Application PCT/EP2021/051036, filed on Jan. 19, 2021, 10 pages.

* cited by examiner

*Primary Examiner* — Luke D Ratcliffe
(74) *Attorney, Agent, or Firm* — XSENSUS LLP

(57) ABSTRACT

An imaging device comprising a control unit configured to cancel a voltage dependent phase error of the imaging device caused by a power supply voltage dependency of a phase angle measured by the imaging device.

20 Claims, 10 Drawing Sheets

CANCEL A VOLTAGE DEPENDENT PHASE ERROR OF A TIME OF FLIGHT IMAGING DEVICE

CROSS-REFERENCE TO RELATED APPLICATIONS

The present application is based on PCT filing PCT/EP2021/051036, filed Jan. 19, 2021, and claims priority to EP Application Serial No. 20152824.7, filed Jan. 21, 2020, the entire contents of each are incorporated herein by reference.

TECHNICAL FIELD

The present disclosure generally pertains to the field of electronic imaging, in particular to time-of-flight imaging.

TECHNICAL BACKGROUND

A time-of-flight camera is a range imaging camera system that determines the distance of objects measuring the time-of-flight (ToF) of a light signal between the camera and the object for each point of the image. A time-of-flight camera thus receives a depth map of a scene. Generally, a time-of-flight camera has an illumination unit that illuminates a region of interest with modulated light, and a pixel array that collects light reflected from the same region of interest. As individual pixels collect light from certain parts of the scene, a time-of-flight camera may include a lens for imaging while maintaining a reasonable light collection area.

In indirect time-of-flight (iToF), a continuous modulated sinusoidal light wave is emitted, the phase difference between outgoing and incoming signals is measured, and from the measured phase difference, the distance of an object can be derived. The distance measurements of the iToF sensor are dependent on temperature, manufacturing influences and power supply voltage, wherein these dependencies are not small. It is difficult to set more strict specification requirements for power supply voltage to customers. Therefore, voltage dependency and changing power supply voltage after shipping of the iToF sensor becomes one of main reasons of limiting accuracy.

Therefore, it is desirable to provide a device or technique to improve the iToF sensor such that voltage dependency of the iToF sensor can be further reduced.

SUMMARY

According to a first aspect the disclosure provides an imaging device comprising a control unit configured to cancel a voltage dependent phase error of the imaging device caused by a power supply voltage dependency of a phase angle measured by the imaging device.

According to a second aspect the disclosure provides a method comprising cancelling a voltage dependent phase error of the imaging device caused by a power supply voltage dependency of a phase angle measured by the imaging device:

According to a second aspect the disclosure provides a computer program comprising instructions which, when executed on a processor, cause the processor to cancel a voltage dependent phase error of the imaging device caused by a power supply voltage dependency of a phase angle measured by the imaging device.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
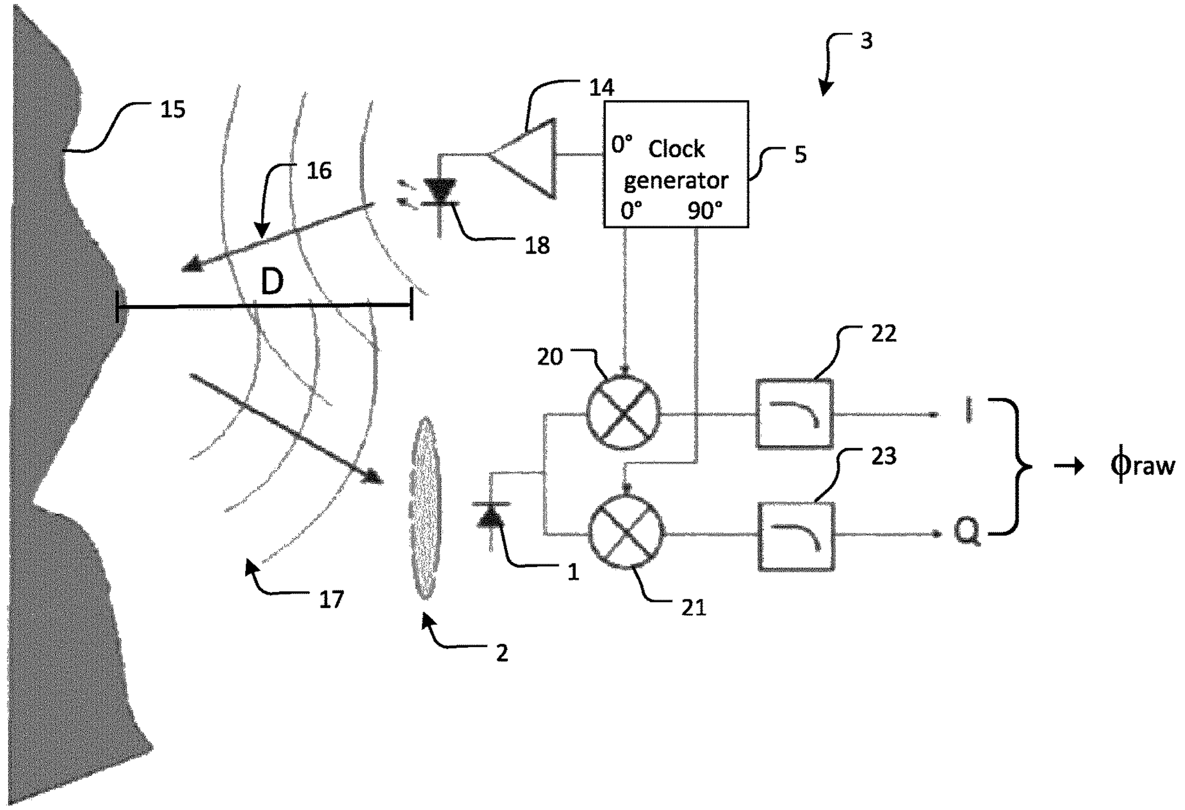
FIG. 1 illustrates schematically the basic operational principle of a time-of-flight sensor.

Before a detailed description of the embodiments under reference of FIG. 1 is given, some general explanations are made.

The embodiments described below in more detail disclose an imaging device that may comprise a control unit configured to cancel a voltage dependent phase error of the imaging device caused by a power supply voltage dependency of a phase angle measured by the imaging device.

The imaging device may be an indirect time of flight camera (iToF) or a direct time of flight camera (ToF). An iToF/ToF camera uses light pulses for capturing a scene. Illumination is switched on for a short time (exposure) and the resulting light pulse that illuminates the scene is reflected by the objects in the field of view. iToF/ToF cameras work by measuring the phase-delay of e.g. reflected infrared light. Phase data may be the result of a cross correlation of the reflected signal with a reference signal (typically the illumination signal).

A control unit may be or include the functionality of a central processing unit (CPU), that is an electronic circuitry within a computer that executes instructions that make up a computer program. The CPU may perform basic arithmetic, logic, controlling, and input/output (I/O) operations specified by the instructions. Further, the control unit may be a microprocessor, where the CPU is contained on a single metal-oxide-semiconductor integrated circuit chip. The control unit may also contain memory, peripheral interfaces, and other components of a computer. The control unit may also be a multi-core processor, which is a single chip containing two or more CPUs.

The phase angle may indicate the current position in the sequence of a periodic operation. In the context of phasors, the phase angle may refer to the angular component of the complex number representation of the function. The phase error may refer to the difference between the nominal value of phase angle and an actual value of a phase angle The voltage dependent phase error may refer to the difference between a nominal phase angle value, that may be obtained when a imaging device performs a depth measurement while being supplied with nominal power supply voltage, and a measured phase angle that is obtained when a imaging device performs a depth measurement while being supplied with a changed power supply voltage other than the nominal voltage.

According to some embodiment the control unit may be configured to determine a compensated phase angle based on the measured phase angle and based on the voltage dependent phase error.

According to some embodiment the compensated phase angle may be determined by subtracting the voltage dependent phase error from the measured phase angle.

According to some embodiment the control unit may be configured to determine the voltage dependent phase error based on a measured power supply voltage value.

According to some embodiment the control unit may be configured to determine the voltage dependent phase error based on the measured power supply voltage value by applying a predetermined characteristic curve.

According to some embodiment the control unit may be configured to determine the voltage dependent phase error based on the measured power supply voltage value by applying a predetermined polynomial model.

According to some embodiment the control unit may be further configured to cancel a temperature dependent phase error of the imaging device caused by a temperature dependency of the phase angle measured by the imaging device.

The temperature dependent phase error may refer to the difference between the nominal phase angle value, that may be obtained when an imaging device performs a depth measurement while being in a nominal temperature, and a measured phase angle that is obtained when an imaging device performs a depth measurement while in a change temperature other than the nominal temperature.

According to some embodiment the control unit may be further configured to cancel a global offset phase error of the imaging device caused by a dependency of the phase angle measured by the imaging device, the global offset phase error being caused by a manufacturing/production process concerning the imaging device.

The global offset phase error may refer to the difference between the nominal phase angle value, that may be obtained when the imaging device performs a depth measurement while having no manufacturing process related offset, and a measured phase angle that is obtained when a imaging device sensor performs a depth measurement while in having a manufacturing process related offset.

According to some embodiment the control unit may be configured to calculate the compensated phase angle based on predetermined nominal values prestored in a memory of the imaging device, based on predetermined model parameters prestored in a memory of the imaging device, and based on voltages, respectively temperatures measured at one or more places on the imaging device, and based on a global offset phase error prestored in a memory of the imaging device.

According to some embodiment the control unit may be configured to calculate the compensated phase angle according to the formula:

$$\phi_{comp} = \phi_{raw} - \phi_{Prod} - C_1(T_{laser} - T_{lasercalib}) - C_2(T_{main} - T_{maincalib}) - C_3(\mathrm{V}_{laser} - \mathrm{V}_{lasercalib}) - C_4(\mathrm{V}_{main} - \mathrm{V}_{maincalib}).$$

According to some embodiment a voltage monitor may be configured to measure a power supply voltage value of the imaging sensor.

The power supply maybe measured by a voltage monitor (also called voltmeter). A voltage monitor/voltmeter may be an instrument that is used for measuring electrical potential difference between two points in an electric circuit. It may for example be used a digital voltmeter, which outputs or displays a numerical display of a voltage by use of an analog to digital converter.

According to some embodiment the voltage monitor may be configured to measure a voltage on a mainboard and/or on a laserboard of the imaging device.

The imaging device may include, for example, one or more light emitting diodes, one or more laser elements or the like, which may be implemented on separate chip, which is called laserboard. According to some embodiment one or more voltage monitors may be configured to measure voltages at multiple places on the imaging device, and wherein the control unit is configured to cancel a voltage dependent phase error of the imaging device caused by the multiple voltages measured by the one or more voltage monitors.

According to some embodiment an imaging sensor may be configured to obtain the phase angle measured by the imaging sensor.

According to some embodiment the imaging sensor may be an iToF imaging sensor.

Further, the embodiments described below in more detail disclose a method that may comprise cancelling a voltage dependent phase error of the imaging device caused by a power supply voltage dependency of a phase angle measured by the imaging device.

Further, the embodiments described below in more detail disclose a computer program that may comprise instructions which, when executed on a processor, cause the processor to cancel a voltage dependent phase error of the imaging device caused by a power supply voltage dependency of a phase angle measured by the imaging device.

Embodiments are now described by reference to the drawings.

FIG. 1 illustrates schematically the basic operational principle of a time-of-flight (ToF) sensor. The ToF device 3 includes a clock generator 5, an amplifier 14, a dedicated illumination unit 18, a lens 2, an imaging sensor 1, a first mixer 20, a second mixer 21. The ToF device 3 captures 3D images of a scene 15 by analyzing the time-of-flight of light from a dedicated illumination unit 18 to an object. The dedicated illumination unit 18 obtains a modulation signal, for example a square wave signal with a predetermined frequency, which is generated by the clock generator 5. The scene 15 is actively illuminated with an emitted light 16 at a predetermined wavelength using the dedicated illumination unit 18. The emitted light 16 is reflected back from objects within the scene 15. A lens 2 collects the reflected light 17 and forms an image of the objects onto the imaging sensor 1 of the ToF device 3. Depending on the distance of objects from the sensor, a delay is experienced between the emission of the emitted light 16, e.g. the so-called light pulses, and the reception at the sensor of those reflected light pulses 17. Distances between reflecting objects and the sensor may be determined as function of the time delay observed and the speed of light constant value.

Indirect time-of-flight (iToF) sensors determine this time delay between the emitted light 16 and the reflected light 17 for obtaining depth measurements by sampling in each iToF sensor pixel with mixers 20, 21 of the imaging sensor 1 a respective correlation waveform 22, 23, e.g. between modulation signals (here 0° and 90°) generated by the timing generator 5 and which act as reference signals, and the reflected light 17 that is stored in the iToF sensor pixel of the imaging sensor 1. iToF sensors typically measure an approximation of a first harmonic of the correlation measurement. This approximation typically uses a limited number of corresponding to different time delays. This first harmonic estimate is also referred to as IQ measurement (with I and Q the real resp. imaginary part of the first harmonic estimate).

Functionality of a iToF Sensor

Consider an iToF sensor pixel imaging an object at a distance D. A (differential) iToF pixel measurement $v(\tau_E, \tau_D)$ is a variable whose expected value is given by $$\mu(\tau_E, \tau_D) = E(v(\tau_E, \tau_D)) = \int_0^{T_I} m(t)\phi_R(t, \tau_E, \tau_D)dt \quad \text{(Eq. 1)}$$

where, t is the time variable, $T_I$ is the exposure time (integration time), m(t) is the in-pixel reference signal ("pixel modulation mix signals") which corresponds to the modulation signal or a phase shifted version of the modulation signal (generated by the clock generator 5 in FIG. 1), and $\Phi_R(t, \tau_E, \tau_D)$ is the pixel irradiance signal which represents the reflected light (17 in FIG. 1) captured by the pixel. $\tau_E$ represents a time variable indicative of the time delay between the in-pixel reference signal (modulation signal) and the emitted light (16 in FIG. 1), and $\tau_D$ is a time variable representing the time that it is required for the light to travel from the iToF device (3 in FIG. 1) to the object (15 in FIG. 1) and back. Neglecting the parallax effect, the time variable $\tau_D$ is given by:

$$\tau_D = \frac{2D}{c} \quad \text{(Eq. 2)}$$

where D is the distance between the iToF sensor and the object, and c is the speed of light.

The reflected light signal $\Phi_R(t, \tau_E, \tau_D)$ is a scaled and delayed version of the emitted light $\Phi_E(t-\tau_E)$. The pixel irradiance signal $\Phi_R(t, \tau_E, \tau_D)$ is given by:

$$\Phi_R(t, \tau_E, \tau_D) = \Phi(\tau_D) \times \Phi_E(t - \tau_E - \tau_D) \quad \text{(Eq. 3)}$$

where $\Phi(\tau_D)$ is a real value scaling factor that depends on the distance D between the ToF sensor and the object, and $\Phi_E(t-\tau_E-\tau_D)$ is the emitted light $\Phi_E(t-\tau_E)$ (16 in FIG. 1) additionally delayed with the time variable $\tau_D$.

In the context of iToF, both m(t) and $\Phi_E(t)$ are periodical signals with period $$T_M = f_M^{-1}$$

($f_M$ being the fundamental frequency or modulation frequency generated by the modulation clock (5 in FIG. 1).

As $T_I \gg T_M$, the expected differential signal $\mu(\tau_E, \tau_D)$ is also a periodical function with respect to the electronic delay $\tau_E$ between in-pixel reference signal m(t) and optical emission $\Phi_E(t-\tau_E)$ with the same fundamental frequency $f_M$.

Writing $\mu(\tau_E, \tau_D)$ in terms of its Fourier Coefficients $M_k$ yields $$\mu(\tau_E, \tau_D) = \Phi(\tau_D)\sum_{k=-\infty}^{\infty}\left(M_k e^{j2\pi k f_M \tau_D}\right)e^{j2\pi k f_M \tau_E} \quad \text{(Eq. 4)}$$

Note that due to the distance-dependent scaling 711 of the light (factor $\Phi(\tau_D)$), the expected differential signal $\mu(\tau_E, \tau_D)$ is not periodical with respect to the time-of-flight $\tau_D$.

From the above it is clear that the time-of-flight, and hence depth, can be estimated from the first harmonic $H_1(\tau_D)$ of $\mu(\tau_E, \tau_D)$:

$$H_{1,\mu}(\tau_D) = \int \mu(\tau_E, \tau_D)e^{-j2\pi f_m \tau_E} d\tau_E \propto \Phi(\tau_D) M_1 e^{j2\pi f_M \tau_D} \quad \text{(Eq. 5)}$$

From the first harmonic $H_{1,\mu}(\tau_D)$ the phase angle $\theta_{1,\mu}(\tau_D)$ is obtained as $$\theta_{1,\mu}(\tau_D) = \angle H_{1,\mu}(\tau_D) = 2\pi f_M \tau_D + \psi_{M_1} \text{ with} \quad \text{(Eq. 6)}$$

$$\psi_{M_1} = \angle M_1 \quad \text{(Eq. 7)}$$

Here, $\angle$ denotes the phase of a complex number $z = re^{i\phi}$ $$\angle z = \angle\left(re^{i\phi}\right) = \phi \quad \text{(Eq. 8)}$$

In practice, it is not feasible to evaluate $H_{1,\mu}(\tau_D)$ due to the presence of noise and due to the number of transmit delays.

Concerning the presence of noise, $H_{1,\mu}(\tau_D)$ is formulated in terms of the expected value $\rho(\tau_E, \tau_D)$ of differential mode measurements $v(\tau_E, \tau_D)$. Estimating this expected value from measurements may be performed by multiple repeated acquisitions (of static scene) to average out noise.

Concerning the number of transmit delays, $H_{1,\mu}(\tau_D)$ is given as an integral over all possible transmit delays $\tau_E$. Approximating this integral may require a high number of transmit delays.

Due to these reasons iToF systems measure an approximation of this first harmonic $H_{1,\mu}(\tau_D)$. This approximation typically uses a limited number of S differential mode measurements (acquisition phases) $v(\tau_{E,n}, \tau_D)$ (n=0, . . . , S−1) corresponding to S electronic transmit delays $\tau_{E,n}$. A vectorized representation of this set of transmit delays is:

$$t_E = [\,\tau_{E,0} \ \cdots \ \tau_{E,S-1}\,]^T \quad \text{(Eq. 9)}$$

The approximation of the first harmonic $H_{1,\mu}(\tau_D)$ is typically obtained by an S-point EDFT (Extended Discrete Fourier Transform), according to $$H_{1,v}(\tau_D;t_E)=\sum_{n=0}^{S-1}v(\tau_{E,n},\tau_D)e^{-j2\pi\frac{hn}{S}} \quad \text{(Eq. 10)}$$

with h being the S-point EDFT bin considered. In standard iToF, h=1. However, depending on the transmit delays selected, different values of h could be more appropriate. For simplicity and without loss of generality, we will assume h=1 in the remainder of this disclosure:

$$H_{1,v}(\tau_D;t_E)=\sum_{n=0}^{S-1}v(\tau_{E,n},\tau_D)e^{-j2\pi\frac{n}{S}} \quad \text{(Eq. 11)}$$

This first harmonic estimate $H_{1,v}(\tau_D; t_E)$ is also referred to as IQ measurement (with I and Q the real resp. imaginary part of the first harmonic estimate). In order to stay close to iToF nomenclature, in the following $H_{1,v}(\tau_D; t_E)$ is denoted as "IQ measurement". However, it is important to remember that an IQ measurement is an estimate of the first harmonic $H_{1,\mu}(t_D)$ of the expected differential measurement (as function of transmit delay).

Due to the statistical nature of the differential mode measurements $v(\tau_{E,n}, \tau_D)$, the IQ measurement $H_{1,v}(\tau_D; t_E)$ is a random variable with the following expected value $$E(H_{1,v}(\tau_D;t_E))\equiv H_{1,\mu}(\tau_D;t_E)=\sum_{n=0}^{S-1}\mu(\tau_{E,n},\tau_D)e^{-j2\pi\frac{n}{S}} \quad \text{(Eq. 12)}$$

This expected value is here referred to as expected IQ measurement. In general, the IQ measurement $H_{1,v}(\tau_D; t_E)$ is a biased estimator of the intended first harmonic $H_{1,\mu}(\tau_D)$, meaning that the expected IQ measurement $H_{1,\mu}(\tau_D; t_E)$ is only an approximation of the intended harmonic $H_{1,\mu}(\tau_D)$ and thus not equal to the intended harmonic:

$$H_{1,\mu}(\tau_D;t_E)\neq H_{1,\mu}(\tau_D) \quad \text{(Eq. 13)}$$

This is because $H_{1,\mu}(\tau_D; t_E)$ relies on a small set of S transmit delays and a measurement of the exact harmonic $H_{1,\mu}(\tau_D)$ requires an infinite amount of transmit delays (integral).

The time-of-flight $\tau_D$, and hence depth, can be estimated from the phase angle $\theta_{1,\mu}(\tau_D; t_E)$ obtained from the IQ measurement $H_{1,\mu}(\tau_D; t_E)$ in analogy to Eq. 6 above as $$\theta_{1,\mu}(\tau_D;t_E)=\angle H_{1,\mu}(\tau_D;t_E)=2\pi f_M\tau_D \quad \text{(Eq. 14)}$$

In the following this phase angle $\theta_{1,\mu}(\tau_D; t_E)$ is briefly denoted as phase angle $\phi_{raw}$.

Ranging Error Due to PVT Dependency of iToF Sensor

Due to the voltage dependency of the iToF sensor, the processing (in terms of manufacturing) dependency of the iToF sensor and the temperature dependency of the iToF sensor, the measured phase angle $\phi_{raw}$ (also $\theta_{1,\mu}$, $(\tau_D; t_E)$ in the general description above) may deviate from nominal value and therefore a ranging error ΔD may occur in the range measurement that is obtained from the phase angle $\phi_{raw}$. The three aforementioned dependencies of the iToF sensor are also called PVT dependencies, where P represents the dependency of the phase angle $\phi_{raw}$ on the "Process", V denotes the dependency of the phase angle $\phi_{raw}$ on the power supply "Voltage" and "T" denotes the dependency of the phase angle $\phi_{raw}$ on the "Temperature".

Any phase errors due to these PVT dependencies should be compensated for in order to calibrate the depth measurement and in order to receive a compensated phase angle $\phi_{comp}$ and in order to correct the ranging error ΔD caused by these dependencies. This compensation of the phase angle $\phi_{raw}$ can be expressed by:

$$\phi_{comp}=\phi_{raw}-\phi_{Volt}-\phi_{Prod}-\phi_{Temp} \quad \text{(Eq. 15)}$$

where $\phi_{volt}$ denotes the phase error caused by the power supply voltage dependency of the measurement, $\phi_{prod}$ denotes a phase error caused by the production process (a global offset which is constant), and $\phi_{Temp}$ denotes the phase error caused by the temperature dependency of the measurement. Compensating any one of these PVT dependencies will result in an enhancement of the measurement result.

According to this embodiment, voltage and temperature is measured at one place within the iToF sensor, for example on the mainboard (i.e. power supply voltage VDD) or on the laserboard. In general it is possible to measure the voltage and/or the temperature at different places within the iToF sensor in order to be able to perform a more accurate compensation.

Figure 2:
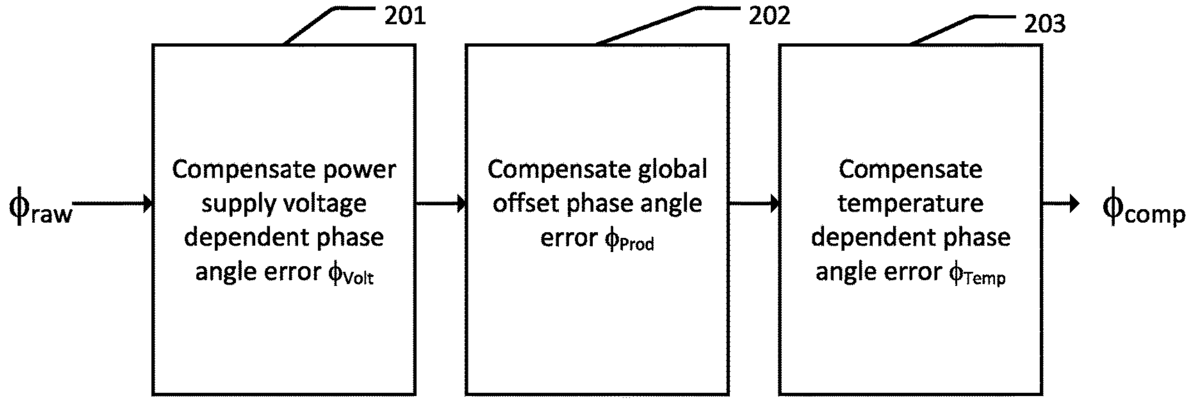
FIG. 2 shows a process of calibrating the phase angle with regard to power supply voltage deviations, a global phase error, and a temperature deviation.

FIG. 2 shows a process of calibrating the phase angle $\phi_{raw}$ with regard to power supply voltage deviations, a global phase error, and a temperature deviation. In 201, a phase angle $\phi_{raw}$, is compensated for a power supply voltage dependent phase error $\phi_{Volt}$ to obtain a power supply voltage compensated phase angle. In 202, the power supply voltage compensated phase angle is compensated for a global offset phase error $\phi_{Prod}$ to obtain a compensated phase angle $\phi_{Comp}$.

It should be noted that the above compensation processes 201, 202, and 203 are independent of each other and can thus be applied separately or in different orders. In particular, it is possible that according to the specific embodiment only the phase error resulting from the power supply voltage is compensated (201 in FIG. 2) and the other compensation processes (202, 203 in FIG. 2) are omitted. That means that the phase angle $\phi_{raw}$ may for example be only compensated by the power supply voltage dependent phase error $\phi_{Volt}$ or the phase angle $\phi_{raw}$ can for example be only compensated by global offset phase error $\phi_{Prod}$. Further, the phase angle $\phi_{raw}$ can be compensated additionally by $\phi_{Volt}$ and $\phi_{Prod}$ or only by the temperature dependent phase error $\phi_{temp}$. It is also possible that phase angle $\phi_{raw}$ is compensated by only $\phi_{temp}$ and $\phi_{Prod}$, or by only $\phi_{Volt}$ and $\phi_{temp}$.

The global offset phase error $\phi_{Prod}$ is caused by the manufacturing/production process concerning the imaging sensor and does not change during runtime. It can thus be determined with conventional calibration techniques before assembling the iToF sensor into a user device at the factory. The thus obtained global offset phase error $\phi_{Prod}$ is stored in a memory of the imaging device as a global compensation parameter and is, at runtime, subtracted from the measured phase angle $\phi_{raw}$ to determined a compensated phase angle $\phi_{comp}$ from the measured phase angle $\phi_{raw}$ according to Eq. 15 above.

The temperature dependent phase error $\phi_{Temp}$ may be obtained by measuring the temperature T at the iToF sensor with a temperature sensor (see 717 in FIG. 7) and then deriving the phase error $\phi_{Temp}$ from the temperature T by, for example, using a pre-recorded characteristic curve (see FIG. 4) which maps the temperature T to a temperature dependent phase error $\phi_{Temp}$.

The embodiments described below in more detail describe the specific aspect of compensating any phase errors caused by the power supply voltage of the imaging sensor.

Compensating the Phase Error Caused by the Power Supply Voltage

Because the power supply voltage of the imaging sensor is different in each smart phone or other user device where it is used, the ranging error (ΔD) due to voltage dependent phase error cannot be determined and removed before assembly of the sensor into the device. Any manufacturing dependent ranging error $\phi_{Prod}$ of the iToF sensor is calibrated after the production of the imaging sensor. However, it should be emphasised again, that the ranging error (ΔD) that occurs after the iToF sensor is assembled into the user device due to the dependency on the power supply cannot be removed at manufacturing time of the imaging sensor.

According to the embodiments described below in more detail, the phase error $\phi_{Volt}$ caused by the power supply is determined by measuring the power supply voltage VDD at the iToF sensor. To achieve this, the iToF sensor is supplied with a voltage monitor (see FIGS. 7 and 7*a* for more details).

Figure 3A:
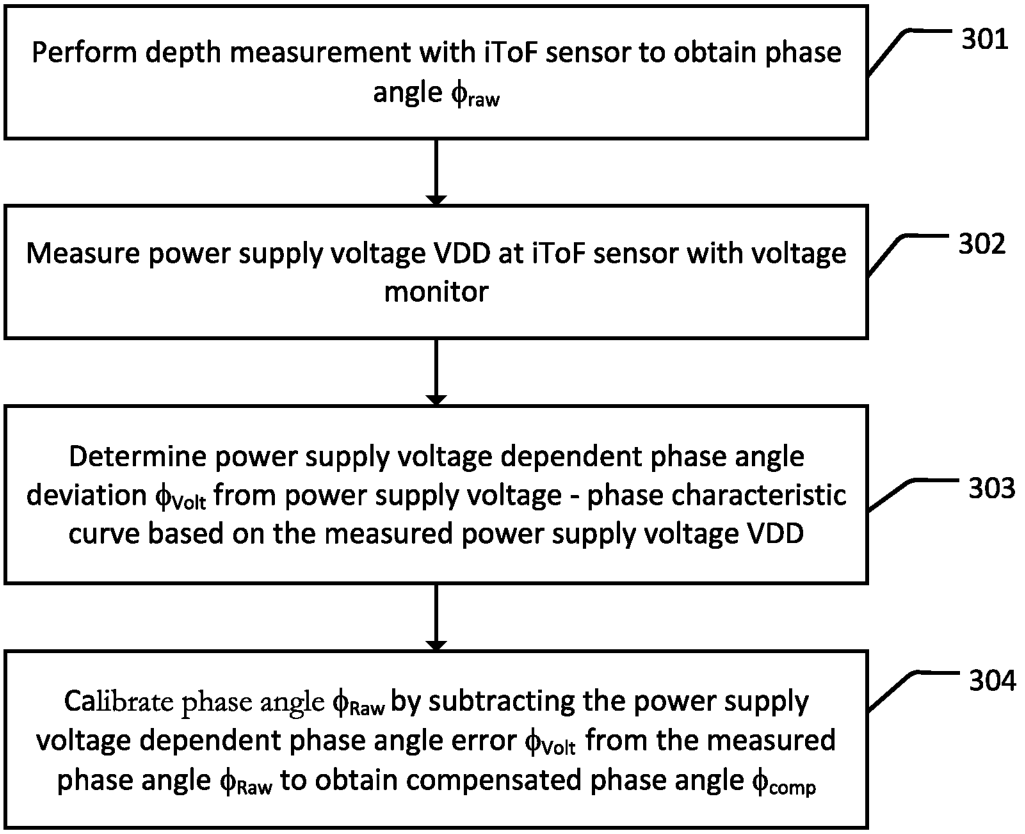
FIG. 3*a* shows an embodiment of a process of compensating the phase error $\phi_{volt}$ which is caused by power supply voltage dependency.
Figure 4:
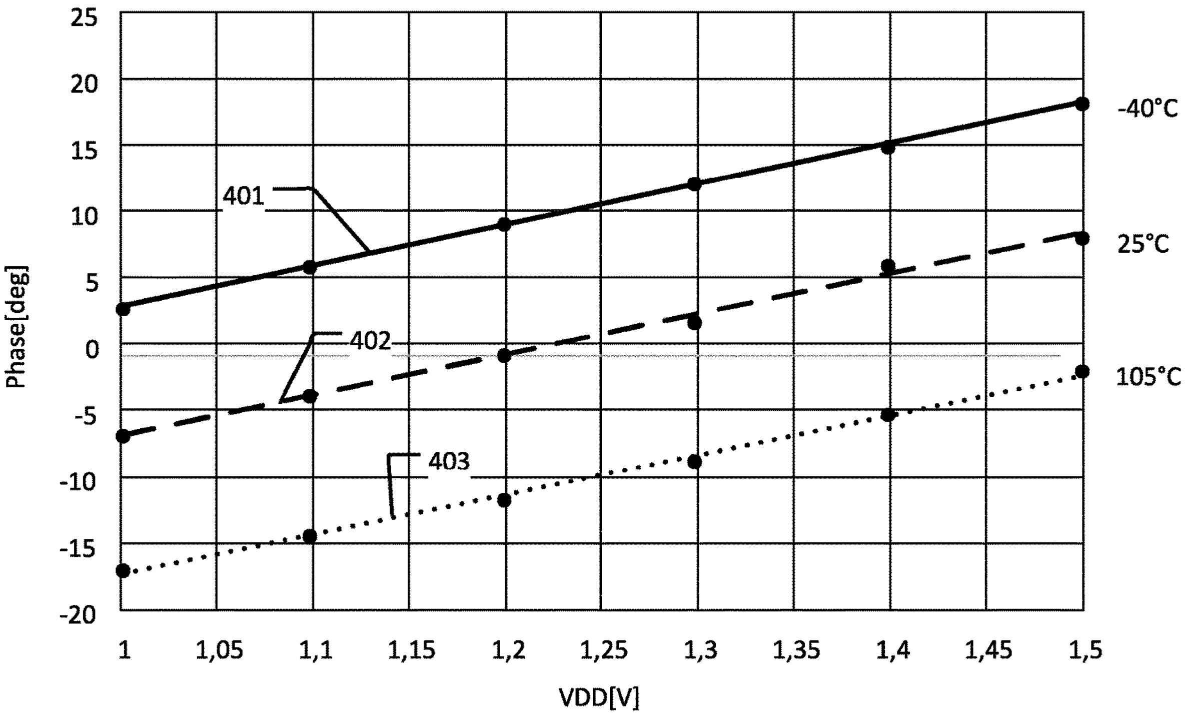
FIG. 4 shows an example of a characteristic curve that maps the dependency between the measured power supply voltage VDD and the power supply voltage dependent phase error.

The phase error $\phi_{Volt}$ resulting from the measured power supply voltage VDD is determined by using a pre-recorded characteristic curve which maps the measured power supply voltage value VDD to a power supply voltage phase error $\phi_{Volt}$ (see FIG. 3*a*, and FIG. 4 for more details).

FIG. 3*a* shows an embodiment of a process of compensating the phase error $\phi_{Volt}$ which is caused by power supply voltage dependency. In 301, a depth measurement with the iToF sensor is performed to obtain phase the angle $\phi_{raw}$. In 302, the power supply voltage VDD at iToF sensor is measured with a voltage monitor. The voltage monitor outputs the measured power supply voltage VDD that is for example received by a processing unit. In 303, the power supply voltage dependent phase error $\phi_{Volt}$ is determined from the characteristic curve based on the measured power supply voltage VDD of the user device.

In 304, the phase angle $\phi_{raw}$ is calibrated by subtracting the power supply voltage dependent phase error $\phi_{Volt}$ from the phase angle $\phi_{raw}$ to obtain the compensated phase angle $\phi_{comp}$.

Figure 3B:
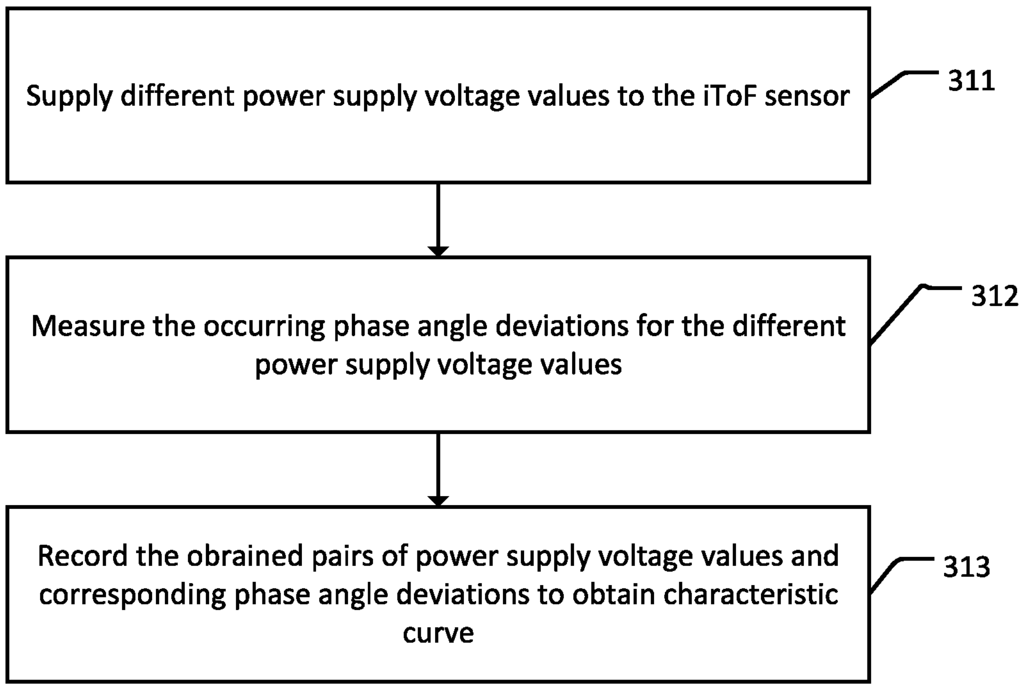
FIG. 3*b* shows a process of determining a characteristic curve which represents the dependency of the phase error from the power supply voltage.

FIG. 3*b* shows a process of determining a characteristic curve which represents the dependency of the phase error from the power supply voltage. The characteristic curve can for example be obtained immediately after manufacture of the imaging device, and in particular before assembling the iToF sensor in a user device. At 311, an iToF sensor is supplied with power supply voltages VDD which deviate from a nominal voltage (where, for example, per definition, no power supply voltage dependent phase error occurs at the nominal voltage). At 312, the occurring power supply voltage dependent phase error $\phi_{Volt}$ is measured. This process is repeated for several different power supply voltage values. At 313, all the measured pairs VDD, $\phi_{Volt}$ are stored into a look up table which represents the characteristic curve. This look up table which implements the characteristic curve, and which represents the dependency of the phase error from the power supply voltage is stored in a memory of a user device. At runtime of the user device, this predetermined characteristic curve can be retrieved from the memory and can be used in a calibration process (see 303 in FIG. 3) in order to compensate the phase error $\phi_{Volt}$ which is caused by power supply voltage dependency of the particular supply voltage of the iToF sensor used at runtime in the imaging device.

FIG. 4 shows an example of a characteristic curve that maps the dependency between the measured power supply voltage VDD and the power supply voltage dependent phase error $\phi_{Volt}$. In the diagram of FIG. 4 the abscissa shows, ranging from 1 V to 1.5 V, the power supply voltage VDD supplied to the iToF sensor. The diagram of FIG. 4 shows three different characteristic curves 401, 402 and 403. The characteristic curves 401, 402 and 403 are obtained as described with regard to the process of FIG. 3*b* by performing measurements where the iToF sensor is supplied with different power supply voltages VDD, here with 1V, 1.1V, 1.2V, 1.3V, 1.4V and 1.5V and measuring the corresponding phase error $\phi_{Volt}$. The ordinate shows, ranging from −20 to 25 degrees, the resulting phase error $\phi_{Volt}$ which is caused by the power supply voltage VDD.

The characteristic curve (solid line) 401 relates to a measurement setup where the temperature of the iToF sensor is at −40° C. The characteristic curve (dashed line) 402 relates to a measurement setup where the temperature of the iToF sensor is at 25° C. The characteristic curve (dotted line) 403 relates to a measurement setup where the temperature of the iToF sensor is at 105° C.

The measured pairs VDD, $\phi_{Volt}$ can be interpolated by using for example interpolation or regression methods. It is also possible that the characteristic curve is approximated by a polynomial model of a certain degree, for example first degree (linear), second degree (quadratic) or higher degree. In this case only the polynomial coefficients must be stored in and the amount to be stored is reduced.

The characteristic curve (i.e. the measured data points of the characteristic curve) or the polynomial model that maps the power supply voltage value (VDD) to the corresponding phase error $\phi_{Volt}$ can be stored in a memory of the user device, for example in a ROM (storage unit 712 in FIG. 7) of the user device.

FIG. 4 shows characteristic curves for the three temperature values −40° C., +25° C., and 105° C. However, measurements for more than three temperatures can be made during the calibration phase and the thus obtained calibration data can be used for the compensation of the temperature dependent phase error $\phi_{Temp}$ as described above with regard to step 203 of FIG. 2 in more detail.

Figure 5A:
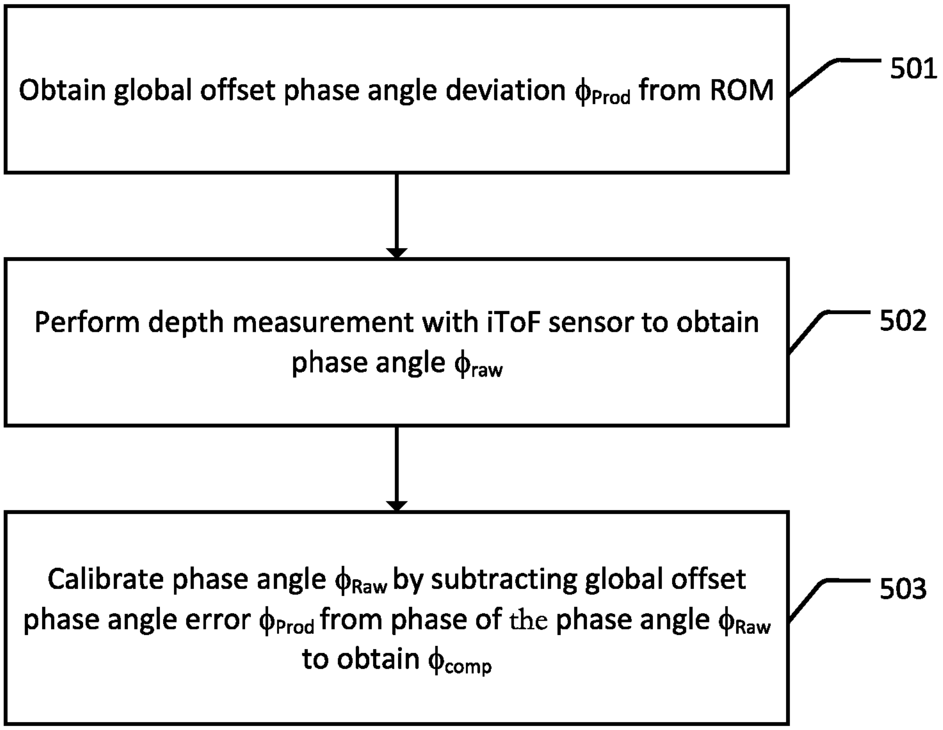
FIG. 5*a* shows an embodiment of the process of compensating the global offset phase error in more detail.

FIG. 5*a* shows an embodiment of the process of compensating the global offset phase error $\phi_{Prod}$ in more detail. In 501, the global offset phase error $\phi_{Prod}$ is obtained from the ROM (or any other storage memory). In 502, a depth measurement with the iToF sensor is performed to obtain the phase angle $\phi_{raw}$. In 503, the phase angle $\phi_{raw}$ is calibrated by subtracting the global offset phase error $\phi_{Prod}$ from phase of the phase angle $\phi_{Prod}$ to obtain the compensated phase angle $\phi_{comp}$.

Figure 5B:
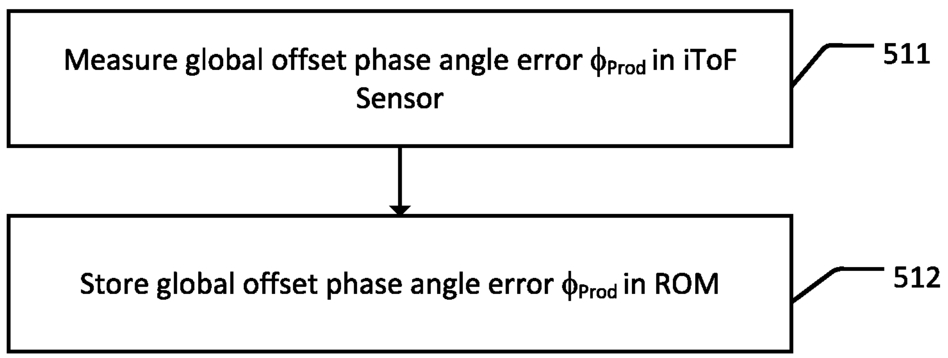
FIG. 5*b* shows the process of determining the global offset phase error.

FIG. 5*b* shows the process of determining the global offset phase error $\phi_{Prod}$. In 511, the global offset phase error $\phi_{Prod}$ is measured in the iToF Sensor. In 512, the global offset phase error $\phi_{Prod}$ is stored in the ROM of the user device.

The global offset phase error $\phi_{Prod}$ is for example measured at factory where the iToF sensors are produced. Due to certain production manufacturing characteristics that are unique to every iToF sensor the global offset phase error $\phi_{Prod}$ may be different for every iToF sensor. The global offset phase error $\phi_{Prod}$ is measured against a nominal value where no ranging error (ΔD) occurs. The global offset phase error $\phi_{Prod}$ is for example stored in the storage memory of the electronic device so that the processing unit of the electronic device that performs the calibration process can read out the global offset phase error $\phi_{Prod}$ when it is needed.

Further, the phase angle $\phi_{raw}$ can be calibrated by compensating for the temperature dependent phase error $\phi_{Temp}$. For example, the temperature T within the iToF sensor can be measured and by applying a temperature—temperature dependent phase error characteristic curve, the temperature dependent phase error $\phi_{Temp}$ can be obtained.

It is important to note that the indirect measurement of the phase errors $\phi_{Volt}$ and $\phi_{Temp}$ is a significant implementation feature because it would also be possible for example to measure the time difference between the emitted light signal $\Phi_E$ and the phase of the reference signal (modulation signal) m(t) which is due to the voltage and temperature dependency in the time domain. Because this time interval is very small it is better to measure the voltage and apply a characteristic curve to determine the phase deviation therefrom.

Further, it should be noted that the PVT phase shift can be due to different aspects. It can be due to PVT dependency of the photodiode 1, it can be due to PVT dependency of the emitting diode 18 or due to PVT dependency of clock 5 or the mixer. The dependency is for example measured via a predetermined characteristic curve (see FIG. 5), which has the advantage that it has not to be known where the exact dependency is coming from, but just what deviation is t causes.

Figure 6:
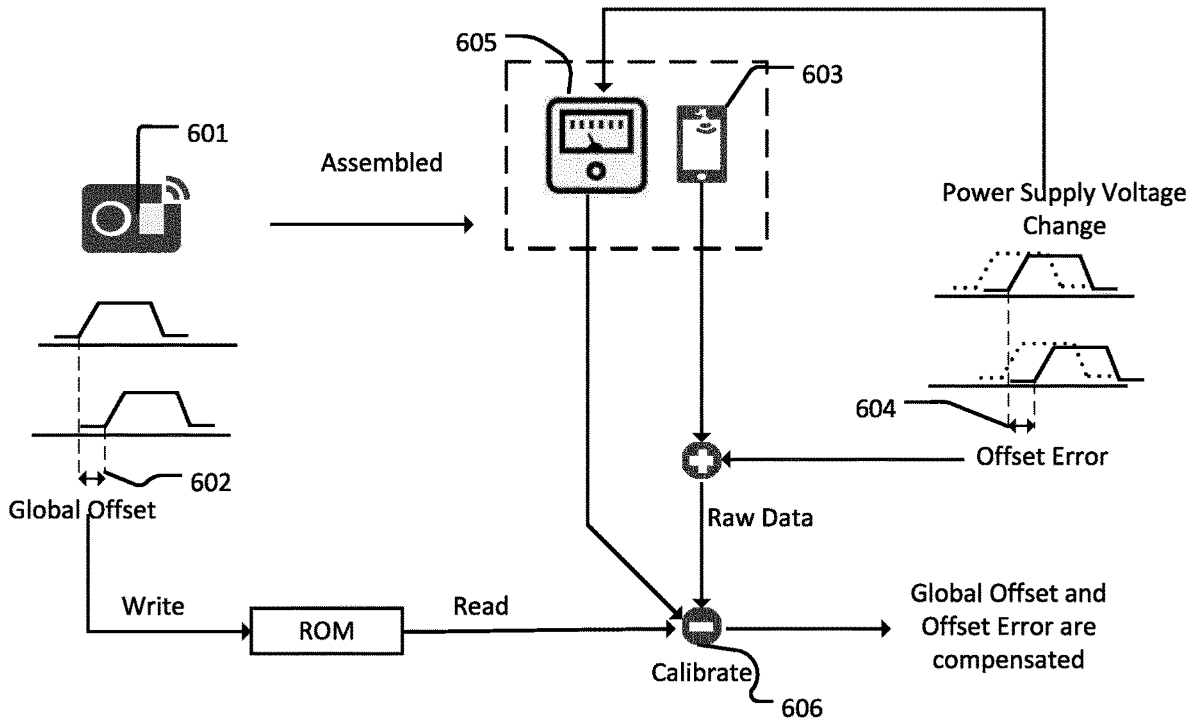
FIG. 6 shows schematically a process of compensating a power supply voltage dependent phase error $\phi_{volt}$ and a global offset phase error in a phase angle obtained by an iTof sensor.

FIG. 6 shows schematically a process of compensating a power supply voltage dependent phase error $\phi_{Volt}$ and a global offset phase error $\phi_{Prod}$ in a phase angle $\phi_{raw}$ obtained by an iToF sensor. Due to production processes a global offset 602 may occur when using an iToF sensor module 601. The global offset is measured at the factory and the global offset phase error $\phi_{Prod}$ is obtained and should have the same value as the global offset 602. The iToF sensor module 601 is assembled into the user device 603 and the global offset phase error $\phi_{Prod}$ is written into a read only memory (ROM) of the user device 603. The power supply voltage that is supplied to the iToF sensor module 601 within the user device 603 may change from a nominal value VNOM to the value VDD and therefore a phase offset error 604 may occur. The voltage monitor 605 measures the power supply voltage VDD which is transformed it into the power supply voltage dependent phase error $\phi_{Volt}$, that has value as phase offset error 604. This transformation may be performed within the user device by using a stored for voltage-phase characteristic curve. The user device 603 takes a depth measurement using the iToF sensor module 601 and produces a corresponding raw data, that is the phase angle $\phi_{raw}$. The phase angle $\phi_{raw}$ is deviated by the global offset 602 and the phase offset error 604. Therefore, in the calibration step 606, the global offset phase error $\phi_{Prod}$ is read from the ROM and subtracted from the phase angle $\phi_{raw}$ and the power supply voltage dependent phase error $\phi_{Volt}$ is delivered from the voltage monitor 605 and subtracted from the phase angle $\phi_{Raw}$. After the calibration step 606 the compensated phase angle $\phi_{Comp}$ is received and the depth measurements delivers a valid result.

The information processing that is schematically performed in the calibration step 606 as well as the transformation from the power supply voltage VDD it into the power supply voltage dependent phase error $\phi_{Volt}$ (for example by using a voltage-phase characteristic curve) may be implemented in an external application processor within the user device 603 or in an internal chip at the iToF sensor module 601 or at an external device where the data is sent to.

Further, the phase angle $\phi_{raw}$ (raw data) can also be compensate by a temperature dependent phase error which is not shown in FIG. 6. If the user device 601 and the iToF sensor module 601 are already equipped with temperature compensation, the voltage compensation can be performed using the same techniques and parts of the already installed temperature processing may also be used.

An advantage of the explained setup is that in order to remove the voltage dependency no internal circuitry must be adapted or optimized or added, for example like a regulator circuit. Another advantage of the explained setup is that the voltage monitor can be implemented in a small area. In addition, the voltage monitor removes all voltage dependencies within the iToF sensor no matter where exactly they occur, for example in the laser output driver or other portions of the iToF sensor. In addition, the data processing effort is not high. A further advantage is, that the phase of the emitted light signal (laser phase) and the phase of the reference signal (guide phase) have not to be measured to get voltage (and production and temperature) dependency. That is an advantage because the voltage (and production and temperature) dependency is very small in time domain and therefore very complex circuitry to measure the phase drift directly would be required.

Figure 7:
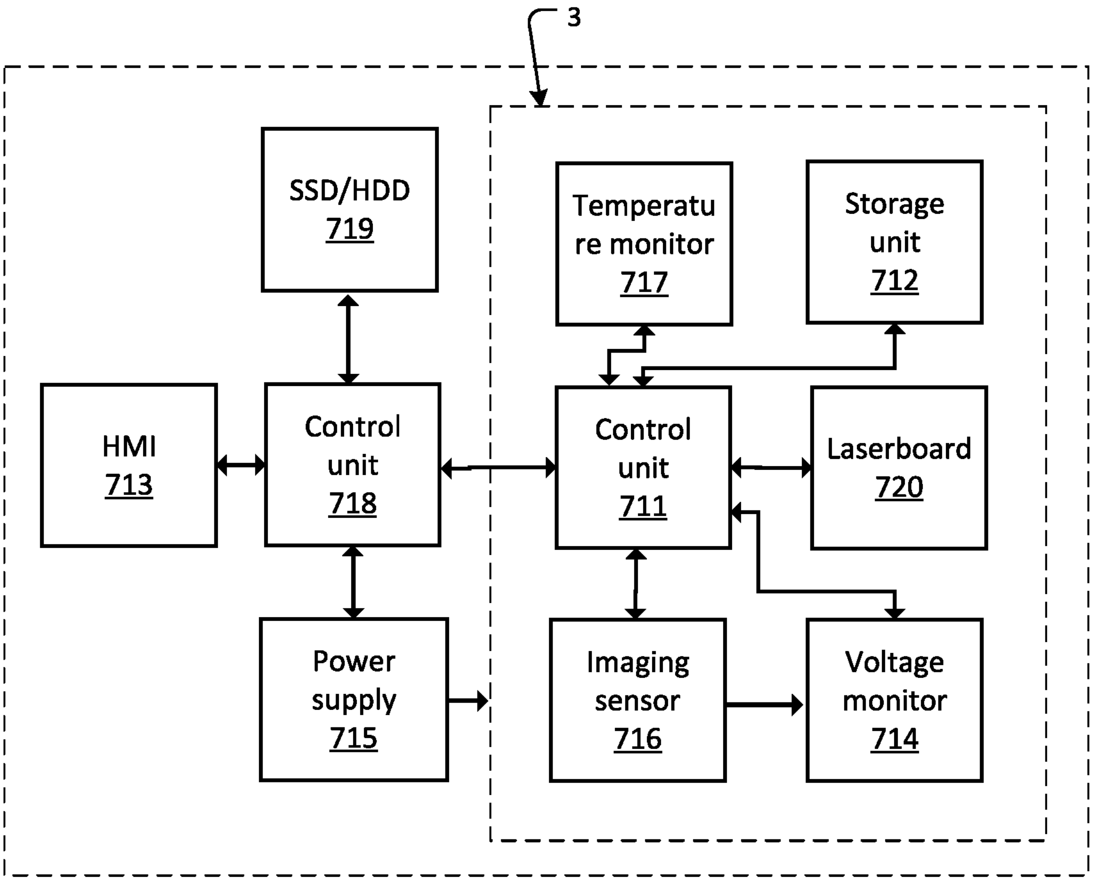
FIG. 7 shows a functional diagram of an iToF sensor which is assembled in a user device.

FIG. 7 shows a functional diagram of an iToF sensor which is assembled in a user device. A user device (e.g. an iToF camera, a smart phone equipped with iToF sensor or the like) comprises a control unit 718. The control unit 718 is connected to a user interface 713 (HMI) of the user device by which the user interface is controlled by the user, e.g. via key or touch input and which comprises one or more displays. The user device further comprises an imaging device 3, here in particular an iToF sensor as described in FIG. 1 in more detail. The user device further comprises a storage unit 719 which for example stores image data obtained from the imaging device 3. The user device further comprises a power supply 715 which is configured to provide power supply voltage to the components of the user device and in particular to the imaging device 3.

The imaging device 3 comprises a control unit 711 which is located on a mainboard of the imaging device 3 and which is configured to obtain imaging data from an imaging sensor 716, here in particular an iToF sensor, e.g. via a I2C or I3C data bus. The control unit 711 of the imaging device 3 is further configured to obtain calibration data such as characteristic curves which map a measured power supply voltage value VDD to a power supply voltage phase error from a storage unit 712. The imaging device 3 obtains a power supply voltage VDD from the power supply 715 of the user device. A voltage monitor 714 (see FIG. **7*a* for more details) measures the power supply voltage VDD which is supplied to the imaging unit 716 from the power supply 715 and transmits the measurement result to the control unit 711 of the imaging device, e.g. by means of an I/O interface of the control unit. A temperature monitor 717 measures the temperature at the imaging sensor 716 and transmits the measurement result to the control unit 711 of the imaging device which uses the measurement. The control unit 711 of the imaging device 3 used the temperature measurement obtained by the temperature monitor 717 and the voltage obtained by the voltage monitor 714 to compensate the imaging data obtained from the imaging sensor 716** for temperature and voltage dependent phase errors.

In the embodiment of FIG. 7 there is provided one voltage monitor 714 which is configured to measure the voltage at a specific place within the iToF, e.g. on the mainboard (i.e. power supply voltage VDD), or alternatively on the laser-board. In general, it is possible to provide multiple voltage monitors in order to measure the voltage at different places within the iToF sensor in order to be able to perform a more accurate compensation. The same applies to temperature monitor 717.

Figure 7A:
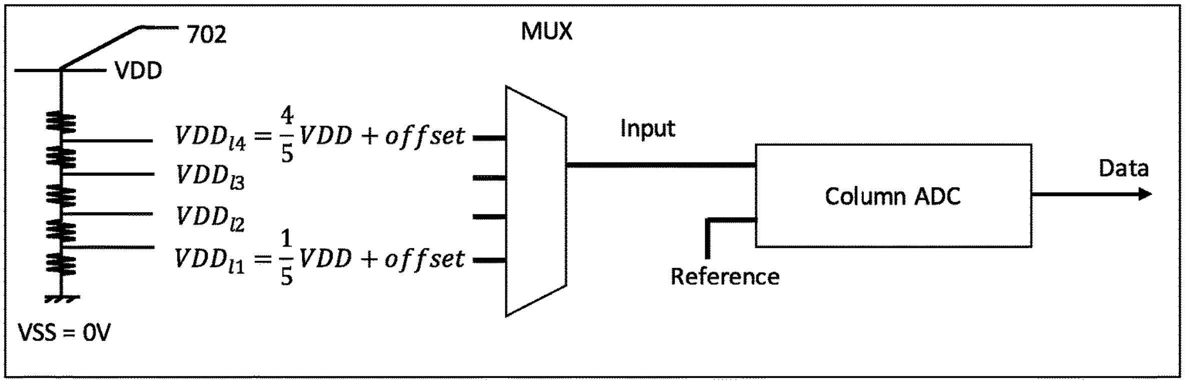
FIG. 7*a* shows an embodiment of a voltage monitor.

FIG. 7*a* shows an embodiment of a voltage monitor. The voltage monitor comprises a resistor ladder voltage divider 702, a multiplexer MUX and a column analog digital converter Column ADC. The resistor ladder voltage divider 702 comprises 5 resistances which all have the same value and the resistor ladder voltage divider 702 receives the analog power supply voltage signal VDD as an input. The resistor ladder voltage divider 702 outputs the voltages $VDD_{11}$, $VDD_{12}$, $VDD_{13}$ and $VDD_{14}$ which are defined by the ration of the resistances, for example they are calculated as $VDD_{11}$=⅕*VDD+offset, . . . , $VDD_{14}$=⅘*VDD+offset. It has to be noted here, that the absolute value of the resistances may strongly depend on the fabrication process, but the resistance ratio is quite stable in terms of fabrication process variation. The voltages $VDD_{11}$, $VDD_{12}$, $VDD_{13}$ and $VDD_{14}$ are input into the multiplexer MUX where one of the input voltages is selected output from the multiplexer MUX and serves as input into the column analog digital converter Column ADC. The column analog digital converter Column ADC receives as an input one of the voltages $VDD_{11}$, $VDD_{12}$, $VDD_{13}$ or $VDD_{14}$ which was selected by the multiplexer MUX and a reference voltage and outputs a digital data (Data), which is calculated as the difference of the input voltage and the reference voltage.

In order to calculate the power supply voltage VDD, at least two different digital data, Data1 and Data2 are calculated, wherein for example the Data1 may be obtain by selecting the voltage $VDD_{14}$ as output of multiplexer MUX and Data2 may for example be obtained by selecting the voltage $VDD_{11}$ as output of the multiplexer MUX, that is:

$$\text{Data1} = \frac{4}{5}VDD + \text{offset} - \text{reference}$$

$$\text{Data2} = \frac{1}{5}VDD + \text{offset} - \text{reference}$$

The power supply voltage VDD is then be calculated as:

$$VDD = \frac{5}{3}(\text{Data1} - \text{Data2})$$

It should be noted that to calculate the power supply voltage VDD at least 2 different voltages are need and $VDD_{11}$ and $VDD_{14}$ are just options.

Model-Based PVT Compensation

In the embodiment of FIG. 4 examples of characteristic curves that map the dependency between the measured power supply voltage VDD and the power supply voltage dependent phase error $\phi_{Volt}$ have been described. These characteristic curves of FIG. 4 were obtained based on calibration measurements that were performed after the production of the imaging sensor.

In the following an alternative embodiment is described in which a characteristic curve that maps the dependency between the measured power supply voltage VDD and the power supply voltage dependent phase error $\phi_{Volt}$ and temperature dependent phase error $\phi_{Temp}$ is obtained in a model-based way.

In general it is possible to measure the voltage and/or the temperature at different places within the iToF sensor in order to be able to perform a more accurate compensation. According to this embodiment, voltage and temperature is measured at two different places within the iToF sensor, namely on the mainboard (i.e. power supply voltage VDD) and on the laserboard.

$V_{laser}$ and $V_{main}$ are the actual voltages on the laserboard and mainboard (of e.g. a 3d iToF sensor). These voltages $V_{laser}$ and $V_{main}$ on the laserboard and mainboard can be measured by using a voltage monitor on the mainboard (3d sensor) and, respectively, a voltage monitor on the laserboard. If for example the voltage at the laserboard is connected to the mainboard, the voltage monitor on the mainboard (3d sensor) can measure the voltage on the laserboard and the voltage on the mainboard, which means that the laserboard may not need a voltage monitor by itself. The other way round is also possible.

The relation between voltage/temperature and phase error on the mainboard as well as the relation between voltage/temperature and phase error on the laserboard are approximated by a first degree polynomial, i.e. by assuming a linear relation:

$$\phi_{Temp} = C_1(T_{laser} - T_{lasercalib}) - C_2(T_{main} - T_{maincalib}) \quad \text{(Eq. 16)}$$

$$\phi_{Volt} = C_3(V_{laser} - V_{lasercalib}) - C_4(V_{main} - V_{maincalib}) \quad \text{(Eq. 17)}$$

The nominal values $T_{maincalib}$, $T_{lasercalib}$, $V_{maincalib}$ and $V_{lasercalib}$ in equations (Eq. 16) and (Eq. 17) are measured during depth offset calibration and these values are defined as the temperature/voltage values where no phase error occurs. These values $T_{maincalib}$, $T_{lasercalib}$ might also be measured immediately after the depth calibration is performed. The values $C_1$, $C_2$, $C_3$, $C_4$ are also obtained during depth offset calibration by letting the voltage and temperature deviate from the nominal values $T_{maincalib}$, $T_{lasercalib}$, $V_{maincalib}$ and $V_{lasercalib}$ and by measuring the respective phase error resulting from the voltage and temperature changes and for example by performing a linear fit.

All calibration values are stored in the memory (for example ROM, see 712 in FIG. 7) of the imaging device.

The compensated phase difference $\phi_{comp}$ can be calculated by inserting equations (Eq. 16) and (Eq. 17) into equation (Eq. 15), which yields $$\phi_{comp} = \phi_{raw} - \phi_{Prod} - C_1(T_{laser} - T_{lasercalib}) - C_2(T_{main} - T_{maincalib}) - C_3(V_{laser} - V_{lasercalib}) - C_4(V_{main} - V_{maincalib}) \quad \text{(Eq. 18)}$$

wherein, the global offset phase error $\phi_{Prod}$ is read from the ROM (712 in FIG. 7) of the imaging device.

As an alternative to a linear model, other models may be applied, e.g. by taking into account in equations 16 and 17 higher order relations such quadratic terms, or the like.

It should be noted that the division of the user device of FIG. 7 into units is only made for illustration purposes and that the present disclosure is not limited to any specific division of functions in specific units. For instance, at least parts of the circuitry could be implemented by a respectively programmed processor, field programmable gate array (FPGA), dedicated circuits, and the like.

All units and entities described in this specification and claimed in the appended claims can, if not stated otherwise, be implemented as integrated circuit logic, for example, on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below:

(1) An imaging device comprising a control unit (711) configured to cancel a voltage dependent phase error ($\phi_{Volt}$) of the imaging device (3) caused by a power supply voltage dependency of a phase angle ($\phi_{raw}$) measured by the imaging device (3).

(2) The imaging device of (1), wherein the control unit (711) is configured to determine a compensated phase angle ($\phi_{comp}$) based on the measured phase angle ($\phi_{raw}$) and based on the voltage dependent phase error ($\phi_{Volt}$).

(3) The imaging device of (1) or (2), wherein the compensated phase angle ($\phi_{comp}$) is determined by subtracting the voltage dependent phase error ($\phi_{Volt}$) from the measured phase angle ($\phi_{raw}$).

(4) The imaging device of anyone of (1) to (3), wherein the control unit (711) is configured to determine the voltage dependent phase error ($\phi_{Volt}$) based on a measured power supply voltage value (VDD).

(5) The imaging device of (4), wherein the control unit (711) is configured to determine the voltage dependent phase error ($\phi_{Volt}$) based on the measured power supply voltage value (VDD) by applying a predetermined characteristic curve.

(6) The imaging device of (4) or (5), wherein the control unit (711) is configured to determine the voltage dependent phase error ($\phi_{Volt}$) based on the measured power supply voltage value (VDD) by applying a predetermined polynomial model.

(7) The imaging device of anyone of (1) to (6), wherein the control unit (711) is further configured to cancel a temperature dependent phase error ($\phi_{Temp}$) of the imaging device (3) caused by a temperature dependency of the phase angle ($\phi_{raw}$) measured by the imaging device (3).

(8) The imaging device of anyone of (1) to (7), wherein the control unit (711) is further configured to cancel a global offset phase error ($\phi_{Prod}$) of the imaging device (3) caused by a dependency of the phase angle ($\phi_{raw}$) measured by the imaging device (3), the global offset phase error ($\phi_{Prod}$) being caused by a manufacturing/production process concerning the imaging device (3).

(9) The imaging device of anyone of (1) to (8), wherein the control unit (711) is configured to calculate the compensated phase angle ($\phi_{comp}$) based on predetermined nominal values ($T_{maincalib}$, $T_{lasercalib}$, $V_{maincalib}$ and $V_{lasercalib}$) prestored in a memory of the imaging device (3), based on predetermined model parameters ($C_1$, $C_2$, $C_3$, $C_4$) prestored in a memory of the imaging device (3), and based on voltages ($V_{laser}$, $V_{main}$), respectively temperatures ($T_{laser}$, $T_{main}$) measured at one or more places on the imaging device, and based on a global offset phase error ($\phi_{Prod}$) prestored in a memory of the imaging device (3).

(10) The imaging device of (9), wherein the control unit (711) is configured to calculate the compensated phase angle ($\phi_{comp}$) according to the formula:

$$\phi_{comp} = \phi_{raw} - \phi_{Prod} - C_1(T_{laser} - T_{lasercalib}) - C_2(T_{main} - T_{maincalib}) - C_3(V_{laser} - V_{lasercalib}) - C_4(V_{main} - V_{maincalib}).$$

(11) The imaging device of anyone of (1) to (10), further comprising a voltage monitor (714) configured to measure a power supply voltage value (VDD) of the imaging sensor (3).

(12) The imaging device of anyone of (1) to (11), wherein the voltage monitor (714) is configured to measure a voltage (VDD) on a mainboard and/or on a laserboard of the imaging device.

(13) The imaging device of anyone of (1) to (12), comprising one or more voltage monitors (714) configured to measure voltages at multiple places on the imaging device (3), and wherein the control unit (711) is configured to cancel a voltage dependent phase error ($\phi_{Volt}$) of the imaging device (3) caused by the multiple voltages measured by the one or more voltage monitors (714).

(14) The electronic device of anyone of (1) to (13), further comprising an imaging sensor (716) configured to obtain the phase angle ($\phi_{raw}$) measured by the imaging sensor.

(15) The imaging device of (14), wherein the imaging sensor is an iToF imaging sensor.

(16) A method comprising cancelling a voltage dependent phase error ($\phi_{Volt}$) of the imaging device (3) caused by a power supply voltage dependency of a phase angle ($\phi_{raw}$) measured by the imaging device (3).

(17) A computer program comprising instructions which, when executed on a processor, cause the processor to cancel a voltage dependent phase error ($\phi_{Volt}$) of the imaging device (3) caused by a power supply voltage dependency of a phase angle ($\phi_{raw}$) measured by the imaging device (3).

The invention claimed is:

1. An imaging device comprising:

a first voltage monitor and a second voltage monitor; and a control circuit configured to:

receive a first voltage from the first voltage monitor measured on a mainboard of the imaging device;

receive a second voltage from the second voltage monitor measured on an illumination circuit of the imaging device;

determine a voltage dependent phase error of the imaging device based on both the measured first voltage and the measured second voltage; and cancel the voltage dependent phase error of the imaging device caused by a power supply voltage dependency of a phase angle measured by the imaging device.

2. The imaging device according to claim 1, wherein the control circuit is configured to determine a compensated phase angle based on the measured phase angle and based on the voltage dependent phase error.

3. The imaging device according to claim 2, wherein the compensated phase angle is determined by subtracting the voltage dependent phase error from the measured phase angle.

4. The imaging device according to claim 2, wherein the control circuit is configured to calculate the compensated phase angle based on predetermined nominal values prestored in a memory of the imaging device, based on predetermined model parameters prestored in a memory of the imaging device, and based on voltages, respectively temperatures measured at one or more places on the imaging device, and based on a global offset phase error prestored in a memory of the imaging device.

5. The imaging device according to claim 4, wherein the illumination circuit is a laserboard and the control circuit is configured to calculate the compensated phase angle according to the formula:

$$\phi_{comp} = \phi_{raw} - \phi_{Prod} - C_1(T_{laser} - T_{lasercalib}) - C_2(T_{main} - T_{maincalib}) - C_3(V_{laser} - V_{lasercalib}) - C_4(V_{main} - V_{maincalib})$$

wherein $\phi_{comp}$ is the compensated phase angle, $\phi_{raw}$ is raw data phase angle, $\phi_{Prod}$ is a global offset phase error, $C_1$ to $C_4$ are predetermined coefficients, $T_{laser}$ is a measured temperature for the laserboard, $T_{lasercalib}$ is a temperature of the laserboard at calibration, $T_{main}$ is a measured temperature for the mainboard, $T_{maincalib}$ is a temperature of the mainboard at calibration, $V_{laser}$ is a measured voltage for the laserboard, $V_{lasercalib}$ is a voltage of the laserboard at calibration, $V_{main}$ is a measured voltage for the mainboard, $V_{maincalib}$ is a voltage of the mainboard at calibration.

6. The imaging device according to claim 1, wherein the control circuit is configured to determine the voltage dependent phase error based on a measured power supply voltage value.

7. The imaging device according to claim 6, wherein the control circuit is configured to determine the voltage dependent phase error based on the measured power supply voltage value by applying a predetermined characteristic curve.

8. The imaging device according to claim 6, wherein the control circuit is configured to determine the voltage dependent phase error based on the measured power supply voltage value by applying a predetermined polynomial model.

9. The imaging device of claim 6, wherein the imaging sensor is an iToF imaging sensor.

10. The imaging device according to claim 1, wherein the control circuit is further configured to cancel a temperature dependent phase error of the imaging device caused by a temperature dependency of the phase angle measured by the imaging device.

11. The imaging device according to claim 1, wherein the control circuit is further configured to cancel a global offset phase error of the imaging device caused by a dependency of the phase angle measured by the imaging device, the global offset phase error being caused by a manufacturing/production process concerning the imaging device.

12. The imaging device of claim 1, further comprising an imaging sensor configured to obtain the phase angle measured by the imaging sensor.

13. The imaging device of claim 12, wherein at least one of the first and second voltage monitors is configured to measure a power supply voltage value of the imaging sensor.

14. The imaging device of claim 13, wherein the voltage monitor includes a resistor ladder voltage divider.

15. The imaging device of claim 14, wherein the control circuit is configured to calculate the power supply voltage value based on at least two different digital data values received from an analog-to-digital converter coupled to the resistor ladder voltage divider.

16. The imaging device of claim 1, wherein the control circuit is on the mainboard of the imaging device.

17. The imaging device of claim 1, wherein the control circuit is configured to determine the voltage dependent phase error based on a difference between the first voltage measured on the mainboard and the second voltage measured on the illumination circuit.

18. The imaging device of claim 1, wherein the illumination circuit is connected to the mainboard via an electrical interconnect, and the control circuit is configured to determine the voltage dependent phase error based on a voltage drop across the electrical interconnect derived from the first voltage and the second voltage.

19. A method comprising:

receiving a first voltage from a first voltage monitor measured on a mainboard of an imaging device;

receiving a second voltage from a second voltage monitor measured on an illumination circuit of the imaging device;

determining a voltage dependent phase error of the imaging device based on both the measured first voltage and the measured second voltage; and cancelling the voltage dependent phase error of the imaging device caused by a power supply voltage dependency of a phase angle measured by the imaging device.

20. A computer program stored on a non-transitory computer-readable medium comprising instructions which, when executed on a processor, cause the processor to receive a first voltage from a first voltage monitor measured on a mainboard of the imaging device;

receive a second voltage from a second voltage monitor measured on an illumination circuit of the imaging device;

determine a voltage dependent phase error of the imaging device based on both the measured first voltage and the measured second voltage; and cancel the voltage dependent phase error of the imaging device caused by a power supply voltage dependency of a phase angle measured by the imaging device.

* * * * *